July 5, 1932.  G. M. ETNYRE  1,865,462
PIPE CONNECTION
Filed April 13, 1929
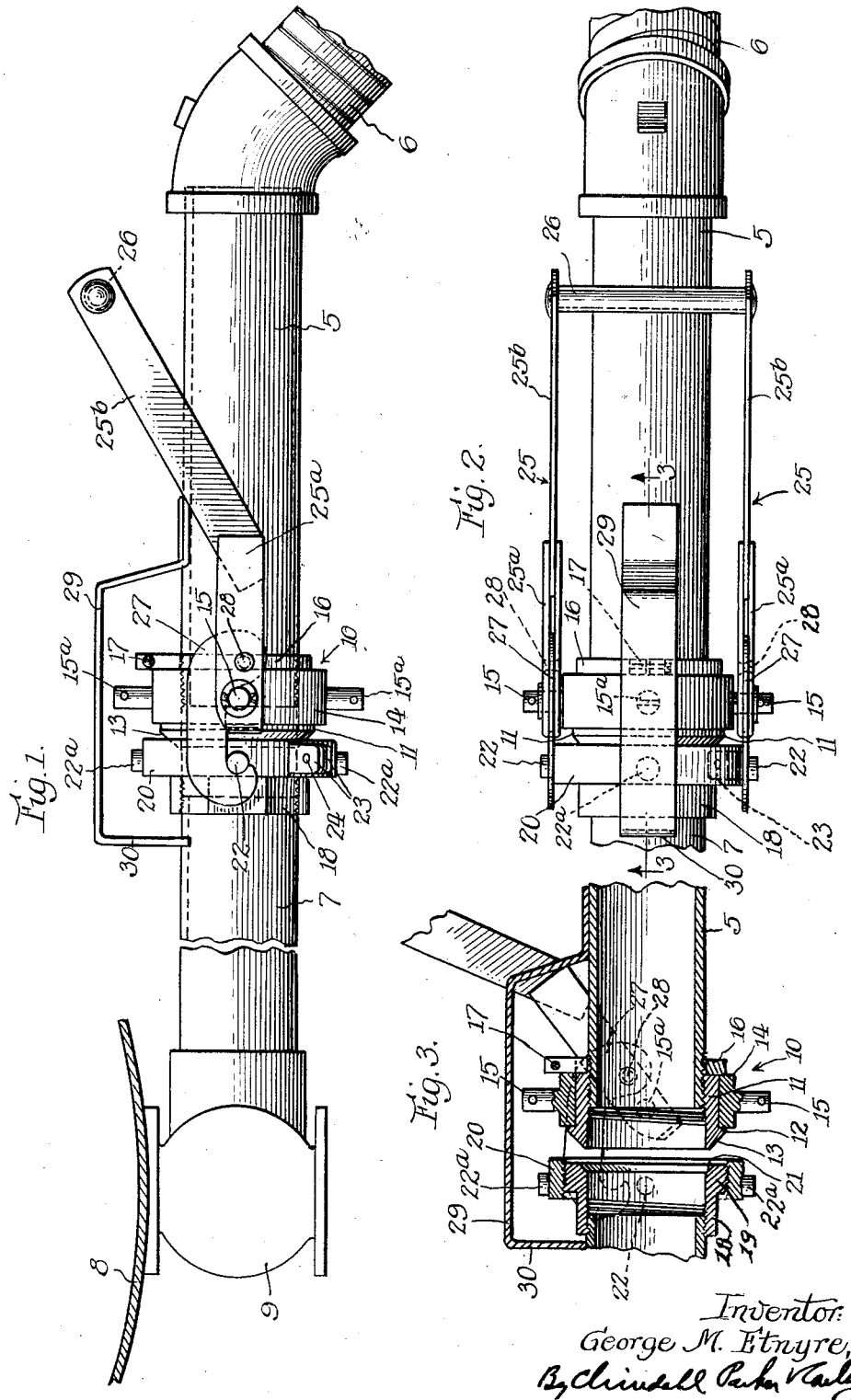
Inventor:
George M. Etnyre,
By Chindall Parker Carlson
Attys Patented July 5, 1932

1,865,462

UNITED STATES PATENT OFFICE

GEORGE M. ETNYRE, OF OREGON, ILLINOIS, ASSIGNOR TO E. D. ETNYRE & COMPANY, INC., OF OREGON, ILLINOIS, A CORPORATION OF ILLINOIS

PIPE CONNECTION

Application filed April 13, 1929. Serial No. 354,736.

The invention relates particularly to pipe connections by which two sections of a pipe may be joined together, and the invention has for its aim the provision of improved means by which two sections of pipe may be rapidly and easily joined together or disconnected from each other.

With this aim in view, the primary object of the invention resides in the provision of a connection of this type which is adjustable to take up looseness occasioned by wear, does not require the use of tools to establish or release the connection, is substantially leak-proof, and in which the two sections become accurately aligned during the joining operation.

Other objects and advantages will become apparent in the following description and from the accompanying drawing, in which:

Figure 1 is a side elevation of two connected pipe sections embodying the present invention.

Fig. 2 is a fragmentary plan view of the same.

Fig. 3 is a central section taken substantially along the lines 3—3 of Fig. 2 showing the connecting means in disassembled relation.

While the invention is susceptible of various modifications and alternative constructions, I have shown in the drawing and will herein describe in detail the preferred embodiment, but it is to be understood that I do not thereby intend to limit the invention to the specific form disclosed, but intend to cover all modifications and alternative constructions falling within the spirit and scope of the invention as expressed in the appended claims.

While the invention is capable of varied uses, I have chosen to illustrate the device in connection with the pipe conduits through which asphalt or other bituminous materials are conveyed to a distributing tank. Thus, in Fig. 1, 5 designates a pipe which is connected by means of a flexible tubing 6 to a supply of the liquid, and 7 indicates another section of pipe, of substantially the same diameter as the pipe 5, permanently connected to a distributor tank, fragmentarily illustrated at 8. Generally a suitable control valve 9 is interposed between the pipe 7 and the tank 8.

Materials of the character of asphalt present a peculiar problem in connection with the handling thereof since they are generally highly viscous, sticky, and gummy at ordinary temperatures. Consequently, the ordinary types of pipe connections are not satisfactory since the ends of the pipes to be joined are usually coated with a thick film of the material which interferes materially in making connections.

In overcoming these disadvantages I provide an adjustable male member on one pipe section and an adjustable complementary female member on the other pipe section, which members are secured together in interfitting relation by a means capable of exerting a powerful contracting force. In addition, the direction of force is exerted in such a direction that the interfitting male and female members, and the corresponding pipe sections, are drawn into positive, definite alignment.

In this embodiment the male member is designated generally at 10 and is shown as being mounted upon the pipe section 5. Referring particularly to Fig. 3, the end of the pipe section 5 is externally screw threaded to receive a sleeve 11. Near its outer end the sleeve 11 is enlarged to form an external annular shoulder 12 which is beveled to form an inwardly and forwardly tapering surface 13. Externally, the sleeve 11 receives a collar 14 which abuts the side of the shoulder 12 and is of such width as to extend substantially to the inner end of the sleeve 11. The collar 14 is capable of rotation on the sleeve 11 and a pair of diametrically opposed stub shafts or trunnions 15 extend radially from and are rigid with the collar.

A simple means is provided for retaining the collar 14 in its seat on the sleeve 11, which means may serve, incidentally, as a stop means on the pipe section for the sleeve 11. Thus, a split clamping ring 16 is slipped over the end of the pipe 5 before the sleeve 11 is mounted thereon. The split ring 16 is of such thickness that it extends above the surface of the sleeve 11 to abut the side face of the collar 14. This construction permits the position of the sleeve 11 on the pipe 5 to be determined and maintained by screwing the sleeve 11 to a desired position on the pipe, then moving the clamping ring into close abutment therewith and locking the ring firmly in such position, in the usual manner, by a screw or bolt 17 which draws the split ends of the ring together. Obviously, adjustments may be made from time to time by releasing the split ring and then moving the sleeve to a new position, after which the abutting engagement of the sleeve is reestablished.

The complementary female member is applied to the pipe section 7 and comprises a sleeve 18 having an internally screw threaded engagement with the end of the pipe section 7. The outer end of the sleeve 18 is enlarged to form a head 19 thereon which is externally screw threaded to receive an internally screw threaded collar 20. The outer end of the sleeve 18 is provided with an internally tapered surface or seat 21 which is substantially the complement of the tapered surface 13 on the male member. The collar 20 carries rigidly therewith a pair of diametrically opposed, radially extending pins or studs 22. For the purpose of adjustment the collar 20 is split, and ears 23, (see Fig. 1) extending from each side of the split, are engaged by a bolt or screw 24 which serves to draw the ends together to clamp the collar 20 tightly on the head 19.

The means by which the operative engagement of the male and female members is effected comprises lever actuated hooking members arranged in such manner that the force employed in establishing the union is exerted along lines substantially parallel to the axis of the aligned pipe sections 5 and 7. To this end, each of the oppositely disposed trunnions 15 has an elongated lever arm 25 pivotally mounted thereon, and a hand piece 26, extending transversely between the outer or free ends of the lever arms, connects the two for simultaneous actuation.

A simple construction, which permits the lever arms 25 to be made of sheet metal, is illustrated (see Figs. 1 and 2) as comprising a lower portion 25$^a$ formed by bending a piece of sheet metal upon itself to provide a narrow elongated U-shaped member which is suitably apertured near the closed end thereof to receive one of the trunnions 15. The upper portion, in the form of an elongated strip 25$^b$, is received between and is suitably secured, as by spot welding, to the free ends of the U-shaped member 25$^a$ and preferably extends at an angle thereto so that the hand piece 26 may clear the adjacent pipe section 5. The legs of each of the U-shaped members 25$^a$ also receive therebetween a hook 27 which is pivotally secured to the leg by a pivot pin 28 off-set from the pivotal mounting thereof. The free ends of the hooks 27 are adapted to engage the studs 22 on the female member, and, when the operating lever is moved toward the pipe section, the two members are firmly drawn together, the pivot pins moving over center so as to lock the parts together. A reverse movement of the lever, of course, moves the hooks out of engagement with the bosses to free the members.

It will be observed that the relative disposition of the pivotal mounting 28 of the hooks 27 thereon is such that the movement of the lever in a clamping direction exerts a pull on the clamping members which is substantially parallel to the axis of the pipe sections, thereby insuring that the complementary surfaces 13 and 21, on the male and female members, will be drawn into positive uniform engagement to provide a fluid tight seal therebetween.

In order to facilitate handling of the loose pipe section 5, in moving said pipe section into initial alignment with the fixed pipe section 7, a simple positioning device may be provided. To this end an elongated member 29 is rigidly secured at one end to the pipe section 5. The member 29 extends forwardly beyond the end of the pipe section 5 and is intermediately offset a sufficient distance to clear the male and female members on the pipe sections when the sections are brought into relatively close abutment. At its free end, the member 29 is turned inwardly to form a portion 30. The end of this portion 30 is appropriately recessed to engage and fit the contour of the pipe section 7, the arranement being such that the male and female members will be substantially aligned when such engagement between the portion 30 and pipe section 7 is established.

Preferably the collar 14, on the male member, carries one or more pairs of auxiliary trunnions 15$^a$, and the collar 20, on the female member, likewise is provided with auxiliary pairs of studs 22$^a$. These auxiliary trunnions and studs are adapted to be used in place of the trunnions 15 and studs 22 when the latter become worn, and thus increase the length of time the device may be used without replacement. Moreover, the extra pair of studs on the female member permits the device to be more accurately adjusted since the hooks 27 are adapted to engage either pair of studs.

I claim as my invention:

1. A pipe connection for securing two sections of pipe together in fluid tight relation having, in combination, a male member on one of said pipe sections comprising a sleeve in screw threaded engagement with said pipe section, an annular head on the outer end of said sleeve having a tapered surface thereon, a split clamping ring on said pipe section arranged to be clamped in abutment with the end face of said sleeve, a collar rotatably mounted on the outer surface of said sleeve between the annular head on the one hand and the split clamping ring on the other, a plurality of radially extending stub shafts on said collar, a female member on the other one of said pipe sections presenting a complementary tapered surface for engagement with the tapered surface on said male member, hook means mounted on said stub shafts, and means on the opposite one of said pipe sections engageable by said hook means to secure said male and female members in operative relation.

2. A pipe connection for securing two sections of pipe together in fluid tight relation having, in combination, a male member on one of said pipe sections comprising a sleeve in screw threaded engagement with said pipe section, an annular head on the outer end of said sleeve having a tapered surface thereon, a split clamping ring on said pipe section arranged to abut the inner end face of said sleeve, a collar rotatably mounted on the outer surface of said sleeve between the annular head on the one hand and the split clamping ring on the other, a plurality of radially extending trunnions on said collar, a female member on the other of said pipe sections comprising a sleeve in screw threaded engagement with the other of said pipe sections and having an outwardly facing tapered surface formed complementarily to the tapered surface on said male member, a collar in screw threaded engagement with said sleeve, a plurality of radially extending studs on said collar, and hooks pivotally carried on said trunnions on said male member adapted to engage said studs on said female member to draw said complementary tapered surfaces into operative engagement.

In testimony whereof, I have hereunto affixed my signature.

GEORGE M. ETNYRE.